United States Patent [19]

Ruvio

[11] Patent Number: 5,035,273
[45] Date of Patent: Jul. 30, 1991

[54] VEHICLE WHEEL RIM DEVICE FOR MOUNTING A FIRST TIRE CASING INWARDLY OF A SECOND TIRE CASING, PROVIDING A SAFETY EMERGENCY WHEEL DEVICE

[76] Inventor: Francesco Ruvio, 19-22 E. 28th St., Brooklyn, N.Y. 11229

[21] Appl. No.: 98,566

[22] Filed: Sep. 21, 1987

[51] Int. Cl.⁵ .................. B60C 5/22; B60C 17/01; B60B 21/10; B60B 23/00
[52] U.S. Cl. .................. 152/340.1; 152/376; 152/379.3; 152/406; 152/518; 301/13 R; 301/13 SM
[58] Field of Search .............. 152/158, 340.1, 376, 152/379.3, 379.4, 518, 406; 301/39 T, 97, 98, 13 R, 13 SM

[56] References Cited

U.S. PATENT DOCUMENTS

| | | | |
|---|---|---|---|
| 1,838,050 | 12/1931 | Brunner | 301/13 R |
| 1,859,936 | 5/1932 | Prescott | 152/406 |
| 3,254,692 | 6/1966 | Travers | 152/340.1 |
| 3,844,325 | 10/1974 | Betancourt | 152/340.1 |
| 4,008,923 | 2/1977 | Walther et al. | 301/13 SM |
| 4,153,095 | 5/1979 | Sarkissian | 152/518 X |
| 4,286,825 | 9/1981 | Sieving | 301/97 X |

FOREIGN PATENT DOCUMENTS

| | | | |
|---|---|---|---|
| 2740014 | 3/1979 | Fed. Rep. of Germany | 152/376 |
| 52-15002 | 2/1977 | Japan | 152/376 |

Primary Examiner—Michael W. Ball
Assistant Examiner—Gregory J. Wilber
Attorney, Agent, or Firm—Robert A. Spray

[57] ABSTRACT

A vehicle wheel rim device of a type in which a first wheel rim carries a first tire casing, and having a second tire casing inwardly of the first tire casing, characterized by the provision of a second rim inwardly of the first rim, the generally circular edge-portions of the second rim being supported by the generally cylindrical body portion of the first rim, and are spaced from the adjacent circular edge-portion of the first rim, and providing that the circular edge-portions of the second rim provide support for the bead-portions of the second tire casing in a manner in which the second tire casing bead portions are substantially spaced, respectively from the beam portions of the first tire casing, thus protecting the inward tire casing from the erratic flopping of the outer tire if it becomes disabled.

8 Claims, 1 Drawing Sheet

VEHICLE WHEEL RIM DEVICE FOR MOUNTING A FIRST TIRE CASING INWARDLY OF A SECOND TIRE CASING, PROVIDING A SAFETY EMERGENCY WHEEL DEVICE

FIELD OF THE INVENTION

The present invention relates to vehicle tires, and more particularly relates to a vehicle wheel rim device of novel concept and construction.

The concepts, even more particularly, relate to wheel rim devices in which a first rim carries a first tire casing, that first tire being the conventional road-engaging tire, with a pair of circular bead-portions carried respectively on inwardly-facing circular edge-portions of the rim, and with the device provided also with a second tire casing inwardly of the said first tire casing, for duty if puncture or other air-loss mishap happens to the first or outer tire casing.

Such "double" tire assemblies have been known for several years, as a general concept and with several variations as to their specific details; and it is to that type of "double" tire device that the present invention relates and provides advantageous improvement in concept and construction.

The present invention, summarized:

According to the concepts of the present invention, for a double-tire device in which a second or "spare" tire is carried within a conventional outer tire, the present invention provides an advantageous improvement for such a device, more particularly the concept of providing a second rim inwardly of the wheel's first rim; and the second rim, similar to the rim which carries the first or outer tire, provides a generally circularly extending support means having a pair of circular support edge-portions, which are not only spaced from one another but, more particularly, each one of the support edge-portions of the second or inner rim is spaced from the adjacent circular edge-portion respectively, of the first rim. This inner rim, and its support-edge spacing from the support edge-portions of the first or outer wheel rim, assures that the bead portions of the second or inner tire casing are substantially spaced from the bead portions of the first tire casing.

This assures better seal of the inner tire casing by holding away a disabled outer tire casing, protecting the inner tire from being damaged by a disabled outer tire as the vehicle continues to move, especially a needed protection because, as the vehicle continues to move, a disabled outer tire which has lost its air pressure and its seal between its bead and the wheel rim will flop and impact with great force against the inner tire; and such damaging action and effect is minimized by the inner or second rim's support of the second or inner tire in a protecting or shielded manner, away from the disabled outer tire and its bead which is no longer being supported by the air pressure lost by the puncture or blowout.

The prior art has never achieved the invention:

As stated above, "tire within a tire" devices have been known for several years; and surely every person in the modern world is quite familiar with the problems of annoyance and even danger which disabled tires pose.

And, as a general concept, such "double-tire" concepts seem to provide the advantage of an already-present and already-mounted spare tire for emergency or so-called "run flat" use.

However, without the present concept of an inner rim and the spacing of the support edges of the inner rim from those of the outer rim, the prior art's "double" tire devices have the disadvantage mentioned above.

The existence of such articles and knowledge of the prior art is not only conceded, it is emphasized; for it is with similarities to those known components and concepts of "double tires" that the present inventive concepts build, accomplishing a device of a construction and an operativity significantly different than just the components and operativities of all the articles of the prior art; and thus the inventive significance of the present concepts is emphasized, and the nature of the concepts and their results can perhaps to easier understood.

Even further as indicating the inventive nature of the present concepts is the result of a Preliminary Patentability Search made in the Search files of the U.S. Patent Office, after this invention was made, the during the course of considering the desire and likelihood of patent protection.

That Search produced three references, all being U.S. Patents, as follows:

| U.S. Pat. No. | Patentee | Date |
| --- | --- | --- |
| 4,153,095 | Sarkissian | May 8, 1979; |
| 4,216,809 | Pixley | August 12, 1980 |
| 4,262,724 | Sarkissian | April 21, 1981 |

These cited patents of the prior art each mention other and earlier patents, showing that these "double" tire devices, and their need for various improvements through the years, have existed even longer than indicated.

And even though all these show various types of these "double tire" devices and show a long-recognized need of improvement of such devices, and even though it may be assumed that all do indeed provide certain improvements, all show, quite in contrast to the present invention, inner tires whose bead portions are non-protectively against the bead portions of the outer tire; and none of these prior art devices show either a second or inner rim or any means at all of holding the bead portions of the two tire casings protectively spaced.

Even the U.S. Pat. No. 4,153,095, although the beads on one side may be hindsight appear to be spaced, at reference number 88, that is a reference to an air passage member; and although that same patent shows sheet-like members 58,60 and 162, these are expressly specified as merely rubber flaps (Col. 4, 1. 15–17; and Col. 18, 1. 13–15) which do not provide support of this present invention's inner rim, and indeed are for a different purpose.)

The invention's components and concepts are similar to those available in the prior art, except for the present combination:

In the hindsight consideration of the present invention to determine its inventive and novel nature, it is not only conceded but emphasized that the prior art had details usable in this invention, but only if the prior art had had the guidance of the present concepts.

That is, it is emphasized that the prior art has long had several particulars:

a. The prior art has had various "double tire" devices for years;

b. The prior art has long known of the disadvantages of the various types of these "double tire" devices;

c. The prior art has long known of situations of annoyance, inconvenience, and even danger of a disabled vehicle parked along a highway;

d. The prior art has long used rigid supports for resilient or flexible components in various fields, even wheel rims as rigid supports for conventional tire casings;

e. A spaced relationship may seem by hindsight to be a proper way of assuring protection;

f. The tires of a "double tire" device show the concept of using a second component;

g. The conventional use of a rim to support a tire shows that a rim for its tire does support it, and for a vehicle's conventional four tires there is a rim for each tire;

h. All of these factors of prior art knowledge and components are well known not only to surely all manufacturers and inventors of vehicle tire accessories and special tires, but even to surely most all persons who have known of or used so-called "double tires" for their "run flat" advantages.

Accordingly, the various concepts and components and knowledge factors of the prior art are conceded and emphasized to have been widely known in the prior art of vehicle tire manufacture and use; nevertheless, with the prior art not having had the particular present concepts, even only a fair amount of realistic humility, to avoid consideration of this invention improperly by hindsight, requires the concepts and achievement here to be realistically viewed as inventive in their nature.

BRIEF DESCRIPTION OF THE DRAWINGS

The above description of the novel and advantageous "double tire" wheel device, and its novel combination of features, is of somewhat introductory and generalized form. More particular details, concepts, and features are set forth in the following and more detailed description of illustrative embodiments, taken in conjunction with the accompanying drawings, which are of somewhat schematic and diagrammatic nature, for showing of the inventive concepts as are illustrated in these embodiments. (The wheel rims, and these tire casings, are of course annular; but for illustrating the concepts, only transverse cross-sections, as would exist along the circumferences, are shown in the drawings.)

In the drawings:

FIG. 2 is a view illustrating the inventive concepts according to a second embodiment, in which inner rim portions are formed integrally with the outer rim;

FIG. 3 is a view illustrating a third embodiment of the invention, in which the inner rim portions are non-integral with the outer rim; and FIG. 4 is a view of a fourth embodiment of the invention, in which the opposite supportive edge-portions of the inner wheel rim are provided as integral portions of a single body member.

DETAILED DESCRIPTION OF ILLUSTRATIVE EMBODIMENTS

Figure 1:
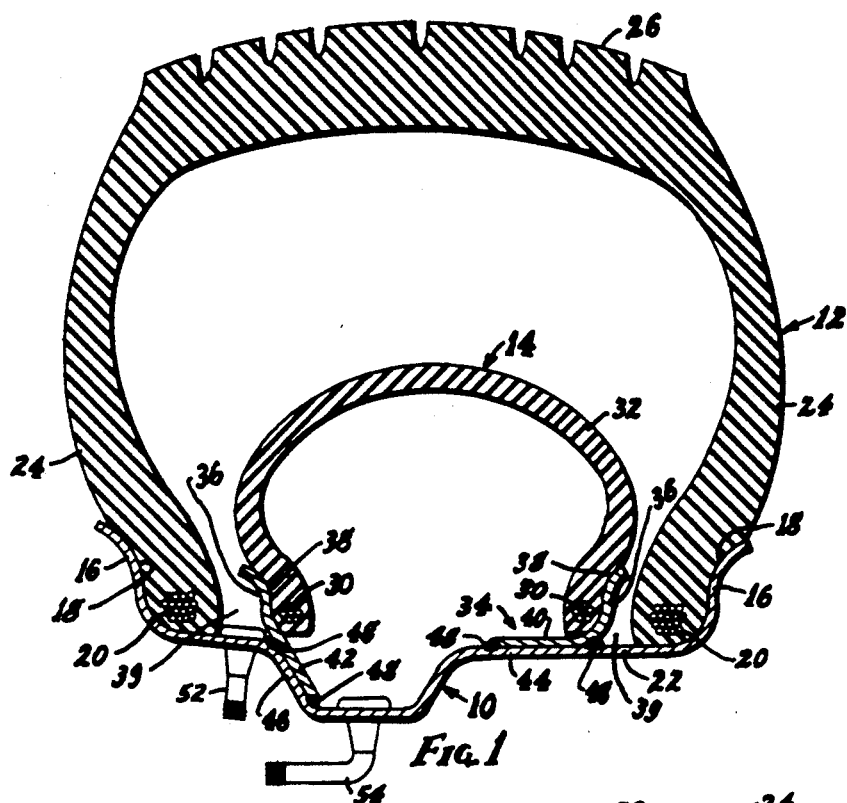
FIG. 1 is a transverse cross-sectional view through a portion along the circumference of a vehicle wheel assembly of "double tire" nature embodying the novel wheel rim concepts of the present invention according a first embodiment, with its inner or second rim provided by two discrete body members individually and supportedly mounted on the wheel rim body upon which the outer (conventional) tire casing is mounted.

As shown in the drawings, four embodiments of the invention illustrate its novel concepts as embodied in wheel assemblies to also show the relation of them to a wheel rim 10, which may be quite conventional, and which carries an outer or first tire casing 12, which also may be of quite conventional type; and as is already a component emphasized as provided by several prior art types, the devices of all four embodiments include a second or inner tire casing 14 for providing an already-mounted spare tire 14 for "run flat" vehicle-operation ability, if a puncture, blowout, or other air-loss leak or other air loss occurs to the outer tire 12.

The first wheel rim 10 is shown as having a pair of generally circular rim edge-portions 16 having inwardly-facing faces 18; and the first or outer tire casing 12 is shown as having a pair of circular bead-portions 20 to be supportedly carried, respectively, on the inwardly-facing faces 18 of the circular edge-portions 16 of the first wheel rim 10.

Such carry of a first or outer tire casing 12 by a single wheel rim 10, with supporting edge-portions 16, against the inwardly-facing faces 18 thereof, is quite conventional.

More particularly as to the conventional first rim 10, it is shown as having a generally cylindrical body portion 22 extending between and carrying the rim's edge-portions 16 which, on their faces 18, carry the outer tire 12.

Also, as quite conventional, the first tire casing 12 is shown as having a generally circular body portion 24; and it is as shown by a portion along its circumference, as being of a general U-shape in transverse cross-section, with a ground-engaging tread portion 26 extending between and including the first tire casing 12's bead portions 20.

As still observing FIG. 1, and as provided by prior art improvements, for providing a "tire within a tire" for "run flat" emergency operation of the vehicle, the wheel device (of all embodiments) is provided also with a second tire casing 14, inwardly of the first tire casing 12, the second tire casing 14 also having a pair of circular bead portions 30 and a generally circular body portion 32, and its portions along its circumference are shown as of a general U-shape in transverse cross-section, extending between and including the second tire casing 14's bead portions 30.

In accordance with the present invention, the invention and this description now departing from the prior art, the present inventive concepts provide the novel and advantageous improvement for such a device, of a second rim means, shown generally in all four embodiments by reference numeral 34, inwardly of the first rim 10; and the second rim means 34, although differing in details in the various embodiments of the invention, is in all the embodiments formed to be generally circular in shape, having in all embodiments a pair of generally circular rim edge-portions 36 having inwardly-facing faces 38. The edge-portions 36 are supportedly connected to the generally cylindrical body portion 22 of the first rim 10, with the generally circular edge-portions 36 of the second rim means 34 spaced respectively from the adjacent generally circular edge-portions 16 of the first wheel rim 10, the spacing indicated by reference numeral 39.

As thus spaced from the first rim 10's edge-portions 16, the generally circular edge-portions 36, and their inwardly-facing faces 38, provide support for the bead-portions 30 of the second or inner tire casing 14 in a protected manner. That is, the provision of the support for the inner or second tire 14 being a second wheel rim means 34, and the spacing 39 of the respective rim edge-portions 16 and 36, provide that when the first tire casing 12 and the second tire casing 14 are assembled into supported positions on the respective inwardly-facing faces 18 and 38 of the edge-portions 16 and 36 of the respective first rim 10 and the second rim means 34, the second or inner tire casing 14's bead portions 30 are substantially spaced from the bead portions 20 of the first or outer tire casing 12, noted by spacing 39.

This separate and spaced support, maintaining the beads 20 and 30 supported apart, in all the embodiments, shown at 39, helps assure that a disablement of the outer or first tire 12, and its consequent irregularity and erratic response to a continued "run flat" operation of the vehicle, probably best described as a sort of flopping and bumping with heavy force against the span 32 of the inner tire 14, will not be likely to "break the seal" of the inner tire 14 against its support faces 38 of the second rim 34's edge-portions 36 which carry the inner tire 14, protected by spacing concept 39 of second rim 34.

In the embodiment shown in FIG. 1, the second rim means 34 is shown provided to be of two portions, each one of those portions 40 and 42 being generally circular, although they are not symmetric. The main or outer rim 10 in this embodiment is itself not symmetric. Thus, as shown in FIG. 1, one flange 40 of the rim means 34 lies generally concentric about the axis of the rim 10 (which of course is co-axial with the axle (not shown) of the main rim 10 when the wheel is mounted on the axle); and the other edge-portion 16's support flange 42 is of a generally conical shape.

Both flanges 40 and 42 lie along, and are supported by, correspondingly-shaped flanges 44 and 46, respectively, of the body 22 of the main rim 10; and welds 48 provide a secure retention of the flanges 40 and 42 to the transversely-spaced although interconnected portions 44 and 46 of the generally cylindrical body portion 22 of the first wheel rim 10.

Figure 2:
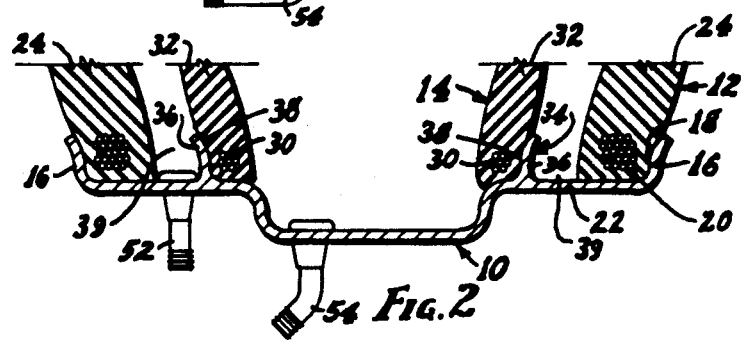
FIGS. 2, 3 and 4 are cross-sectional views generally as per FIG. 1 although of fragmental nature, to illustrate the concepts of the invention of a second or inner wheel rim means, holding the beads of the inner tire casing protectively spaced from those of the outer tire casing, as mounted upon the outer wheel rim body which carries the outer tire casing, that outer wheel rim body being shown as symmetric about a central plane, in contrast to FIG. 1 in which the outer wheel rim is non-symmetric as are conventional wheel rims of presently-used prior art; and, more particularly as to FIGS. 2-4.

As shown in the embodiment of FIG. 2, at least one of the respective edge-portions 36 in this embodiment is provided to be an integral protrusion from the generally cylindrical body portion 22 of the first wheel rim 10; and as shown in FIG. 2, both edge-portions 36 are provided in that form, integral with the main rim 10's body 22.

Figure 3:
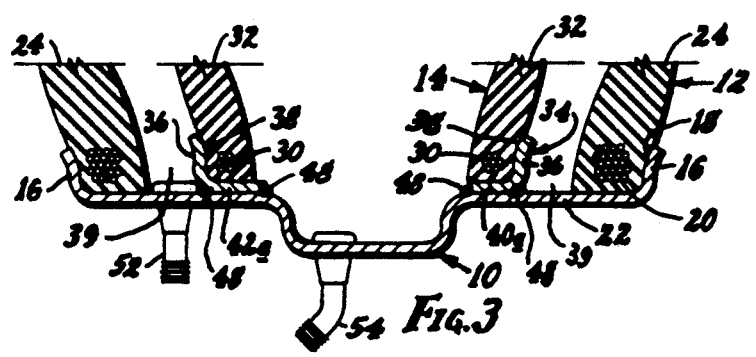
Figure 4:
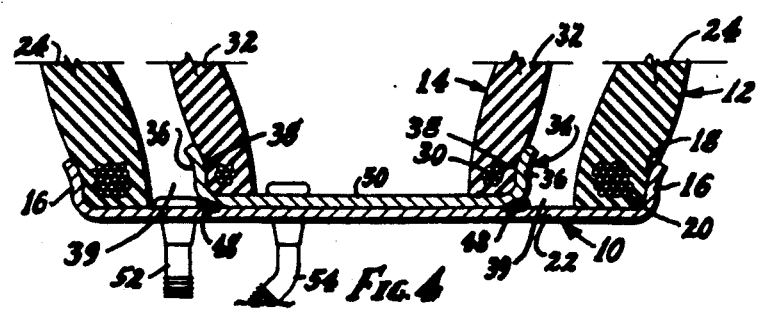

In the embodiments of FIGS. 2, 3, and 4, the generally circular edge-portions 36 of the second rim means 34 are shown as generally identical except only for being of opposite-facing nature; and, as to the inwardly-facing faces 38 against which the bead-portions 30 of the inner tire casings 14 (in all embodiments) seat, those faces 38 are shown as generally identical except only for being of oppositely-facing nature.

The third embodiment, that is, as shown in FIG. 3, is substantially like that of FIG. 1, except that in FIG. 3 the inner rim means 34 and its supportive edges 36 are symmetrical, as are the components of the main or first rim 10. Welds 48 are shown retaining the inner generally cylindrical flanges 40a and 42a, to the rim 10's body 22.

In FIG. 4 there is shown a fourth embodiment, in which the second wheel rim means 34 includes a generally cylindrical body member 50 which carries the second wheel rim means 34's generally circular edge-portions 36, as an integral body, here shown of symmetric form, and welded as at 48 to the first or outer wheel rim 10.

In all embodiments, the respective tire casings 12 and 14 are respectively provided with their own air inlets shown by the valves 52 and 54 respectively, located of course at appropriate places on the first or outer wheel rim 10 to communicate respectively to the annular region inside each of the tire casings 12 and 14, those regions of course being non-communicative.

CONCLUSION

It is thus seen that a vehicle wheel rim device constructed and used according to the inventive concepts herein set forth, provides novel concepts of a desirable and advantageous device, yielding the advantages of an instantly-available spare tire which provides the many advantages herein indicated, as to providing for the continuity of the ability of a car to be driven for what may usually be an ample distance to a site of tire-repair, avoiding having to stop and face the inconvenience and even danger of a disabled vehicle along a road, etc.

In summary as to the nature of these advantageous concepts as herein specified their inventiveness is shown by novel features of concept and construction shown herein, and by the novel concepts hereof not only being different from all the prior art known, but because the achievement is not what is or has been suggested to those of ordinary skill in the art, especially realistically considering this as comprising components which individually are similar in nature to what is well known to most persons, surely including most of the many makers and users of for many years, the entire world over, a substantial portion of all persons surely having seen a wheel rim with its tire disassembled therefrom, and a substantial portion of all adults having experienced or heard of tire-disability hardships, inconvenience, and dangers.

And even though spare tires, including those carried on a rim inwardly of a conventional tire, have been known for many years, no prior art has suggested the modifications of any prior art to achieve the novel concepts here achieved, with the interior tire carried on an inner second wheel rim, with the bead of the inner tire held significantly spaced from the disabled outer tire casing, even though the spare tire concepts have been known for years; and quite certainly no particular combination of prior art has been suggested by the prior art, this achievement being a substantial and advantageous departure from prior art, even though the prior art shows various attempts at improvement for years. And particularly is the overall difference from the prior art significant when the non-obviousness is viewed by a consideration of the subject matter as a whole, as integrally incorporating the features different from the prior art, in contrast to merely those details of novelty themselves, and further in view of the prior art teaching away from the spacing of the inner tire beads from the outer tire.

Accordingly, it will thus be seen from the foregoing description of the invention according to this illustrative embodiment, considered with the accompanying drawings, that the present invention provides new and useful concepts of a novel and advantageous vehicle wheel rim device having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

I claim:

1. A vehicle wheel rim device for a first wheel rim which carries a first tire casing, the first wheel rim having a pair of generally circular edge-portions having inwardly-facing faces, and the first tire casing having a pair of circular bead-portions to be supportedly carried respectively on the inwardly-facing faces of the circular edge-portions of the said first wheel rim, the said first rim having a generally cylindrical body portion extending between the said edge-portions of the said first rim, the said first tire casing having a generally circular body portion, its portions along its circumference being of a general U-shape in transverse cross-section, extending between and including the first tire casing's bead portions, the said device provided also with a second tire casing inwardly of the said first tire casing, the second tire casing also having a pair of circular bead portions and a generally circular body portion, and its portions along its circumference being of a general U-shape in transverse cross-section, extending between and including the said second tire casing's said bead portions, the device having a second rim means inwardly of the first rim, generally circular in shape, having a pair of generally circular edge-portions having inwardly-facing faces, and supportedly connected to the generally cylindrical body portion of the first rim, with the generally circular edge-portions of the second rim means spaced respectively from the adjacent generally circular edge-portions of the first rim, the said generally circular edge-portions and their inwardly-facing faces, of the second rim means, providing support for the bead-portions of the second tire casing in a manner in which, when the first tire casing and the second tire casing are assembled into supported positions on the respective inwardly-facing faces of the edge-portions of the respective first rim and the second rim means, the second tire casing's bead portions are substantially spaced from the bead portions of the first tire casing, the second rim means being provided to be of two separate and non-integral portions, each generally circular, and respectively supportedly connected to transversely-spaced portions of the generally cylindrical body portion of the first wheel rim but not integral therewith, then permanently jointed thereto, in a combination in which the said first wheel rim and its generally circular edge-portions are symmetric.

2. A vehicle wheel rim device for a first wheel rim which carries a first tire casing, the first wheel rim having a pair of generally circular edge-portions having inwardly-facing faces, and the first tire casing having a pair of circular bead-portions to be supportedly carried respectively on the inwardly-facing faces of the circular edge-portions of the said first wheel rim, the said first rim having a generally cylindrical body portion extending between the said edge-portions of the said first rim, the said first tire casing having a generally circular body portion, its portions along its circumference being of a general U-shape in transverse cross-section, extending between and including the first tire casing's bead portions, the said device provided also with a second tire casing inwardly of the said first tire casing, the second tire casing also having a pair of circular bead portions and a generally circular body portion, and its portions along its circumference being of a general U-shape in transverse cross-section, extending between said including the said second tire casing's said bead portions, the device having a second rim means inwardly of the first rim, generally circular in shape, having a pair of generally circular edge-portions having inwardly-facing faces, and supportedly connected to the generally cylindrical body portion of the first rim, with the generally circular edge-portions of the second rim means spaced respectively from the adjacent generally circular edge-portions of the first rim, the said generally circular edge-portions and their inwardly-facing faces, of the second rim means, providing support for the bead-portions of the second tire casing in a manner in which, when the first tire casing and the second tire casing are assembled into supported positions on the respective inwardly-facing faces of the edge-portions of the respective first rim and the second rim means, the second tire casing's bead portions are substantially spaced from the bead portions of the first tire casing, the second rim means being provided to be of two separate and non-integral portions, each generally circular, and respectively supportedly connected to transversely-spaced portions of the generally cylindrical body portion of the first wheel rim but not integral therewith, then permanently jointed thereto, in a combination in which the generally circular edge-portions of the second rim means are generally identical except only for being of opposite-facing nature, in a combination in which the said first wheel rim and its generally circular edge-portions are symmetric.

3. A vehicle wheel rim device for a first wheel rim which carries a first tire casing, the first wheel rim having a pair of generally circular edge-portions having inwardly-facing faces, and the first tire casing having a pair of circular bead-portions to be supportedly carried respectively on the inwardly-facing faces of the circular edge-portions of the said first wheel rim, the said first rim having a generally cylindrical body portion extending between the said edge-portions of the said first rim, the said first tire casing having a generally circular body portion, its portions along its circumference being of a general U-shape in transverse cross-section, extending between and including the first tire casing's bead portions, the said device provided also with a second tire casing inwardly of the said first tire casing, the second tire casing also having a pair of circular bead portions and a generally circular body portion, and its portions along its circumference being of a general U-shape in transverse cross-section, extending between and including the said second tire casing's said bead portions, the device having a second rim means inwardly of the first rim, generally circular in shape, having a pair of generally circular edge-portions having inwardly-facing faces, and supportedly connected to the generally cylindrical body portion of the first rim, with the generally circular edge-portions of the second rim means spaced respectively from the adjacent generally circular edge-portions of the first rim, the said generally circular edge-portions and their inwardly-facing faces, of the second rim means, providing support for the bead-portions of the second tire casing in a manner in which, when the first tire casing and the second tire casing are assembled into supported positions on the respective inwardly-facing of the edge-portions of the respective first rim and the second rim means, the second tire casing's bear portions are substantially spaced from the bead portions of the first tire casing, the improvement for such a device, comprising the provision that the said second wheel rim means includes a generally cylindrical body member which carries the second wheel rim means's generally circular edge-portions.

4. The invention as set forth in claim 3 in a combination in which at least one of the generally circular edge-portions of the second wheel rim means is an integral protrusion of the said body member.

5. The invention as set forth in claim 4 in a combination in which the said first wheel rim and its generally circular edge-portions are symmetric.

6. The invention as set forth in claim 3 in a combination in which both of the generally circular edge-portions of the second wheel rim means are provided as integral protrusions of the said body member.

7. The invention as set forth in claim 6 in a combination in which the said first wheel rim and its generally circular edge-portions are symmetric.

8. The invention as set forth in claim 3 in a combination in which the said first wheel rim and its generally circular edge-portions are symmetric.

* * * * *

UNITED STATES PATENT AND TRADEMARK OFFICE
CERTIFICATE OF CORRECTION

PATENT NO. : 5,035,273
DATED : July 30, 1991
INVENTOR(S) : Francesco Ruvio

It is certified that error appears in the above-identified patent and that said Letters Patent is hereby corrected as shown below:

Col. 1, line 27: The line should be printed as a heading.

Col. 1, line 61: The line should be printed as a heading.

Col. 2, lines 57-59: The lines should be printed as a heading.

Col. 7, line 18: The line should be deleted, and replaced by the word -- Claims --.

Col. 8, line 24: Change "said" (1st occurrence) to -- and --.

Col. 10, line 1: After the word "inwardly-facing" insert -- faces --.

Col. 10, line 3: Correct the spelling of -- bead --.

Col. 10, line 8: Correct the spelling of -- means' --.

Signed and Sealed this

Thirtieth Day of March, 1993

Attest:

STEPHEN G. KUNIN

*Attesting Officer*    Acting Commissioner of Patents and Trademarks